United States Patent [19]

Gottschalk

[11] 4,118,720
[45] Oct. 3, 1978

[54] VIEWFINDER EYEPIECE LEVELING DEVICE

[75] Inventor: Robert E. Gottschalk, Los Angeles, Calif.

[73] Assignee: Panavision, Incorporated, Tarzana, Calif.

[21] Appl. No.: 756,191

[22] Filed: Jan. 3, 1977

[51] Int. Cl.² ............................................. G03B 29/00
[52] U.S. Cl. ..................................... 354/81; 352/243
[58] Field of Search ................... 352/243; 354/81, 293, 354/166

[56] References Cited

U.S. PATENT DOCUMENTS 3,913,116  10/1975  Kastner et al. ................... 352/243
4,037,763  7/1977  Turchen ............................ 352/243

Primary Examiner—Monroe H. Hayes
Attorney, Agent, or Firm—Lyon & Lyon

[57] ABSTRACT

A motion picture camera is mounted upon a gear head for tilting movement, and the camera is provided with a viewfinder eyepiece device mounted to pivot about a horizontal axis. A link is pivotally connected at one end to the viewfinder eyepiece device and is pivotally connected at the other end to a nontilting portion of the gear head, whereby movement of the viewfinder eyepiece device is minimized during tilting movement of the camera.

4 Claims, 4 Drawing Figures

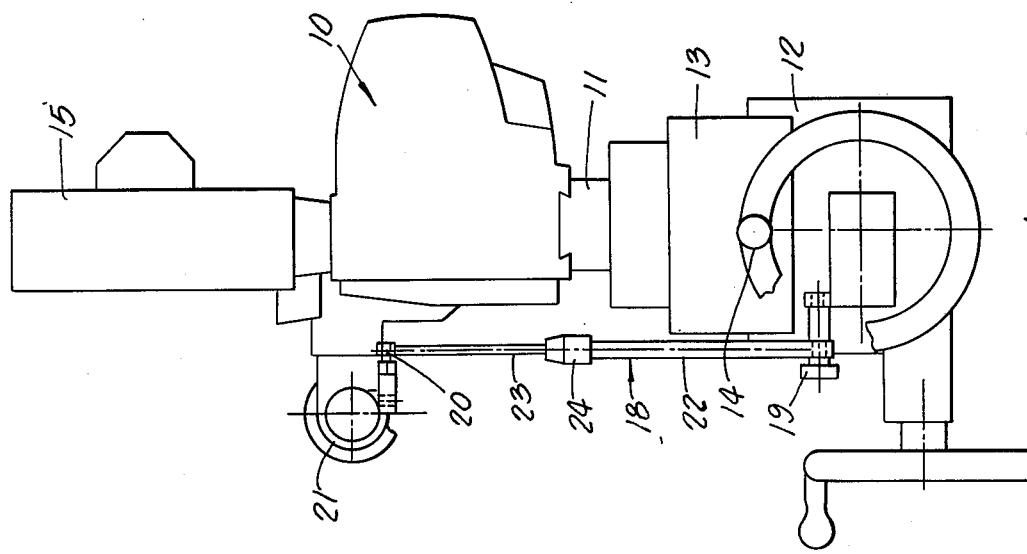
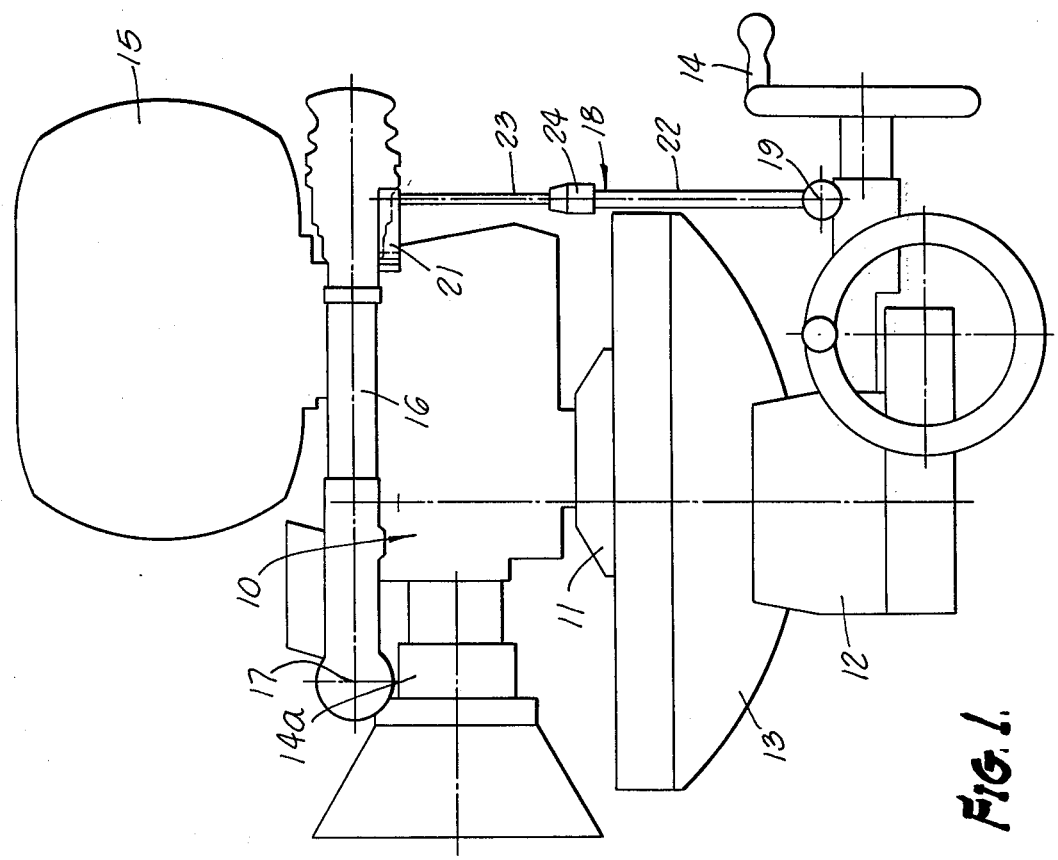

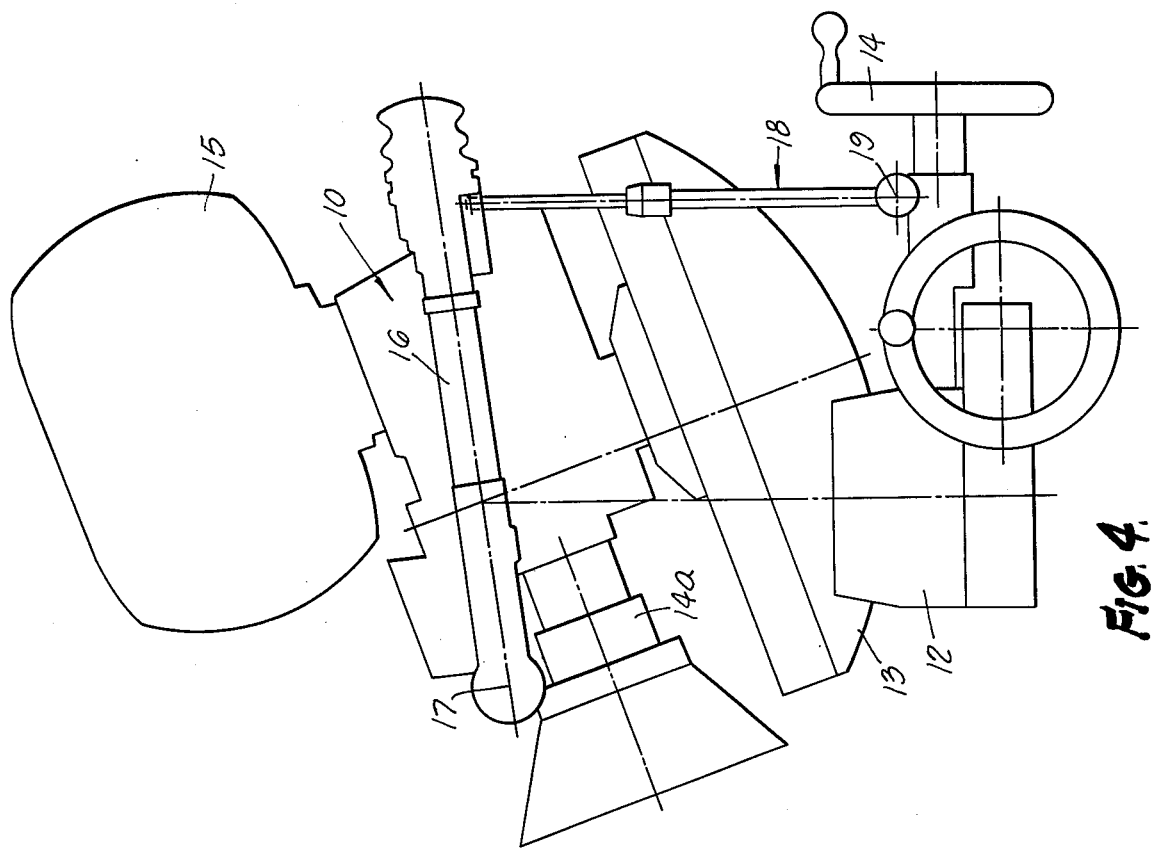
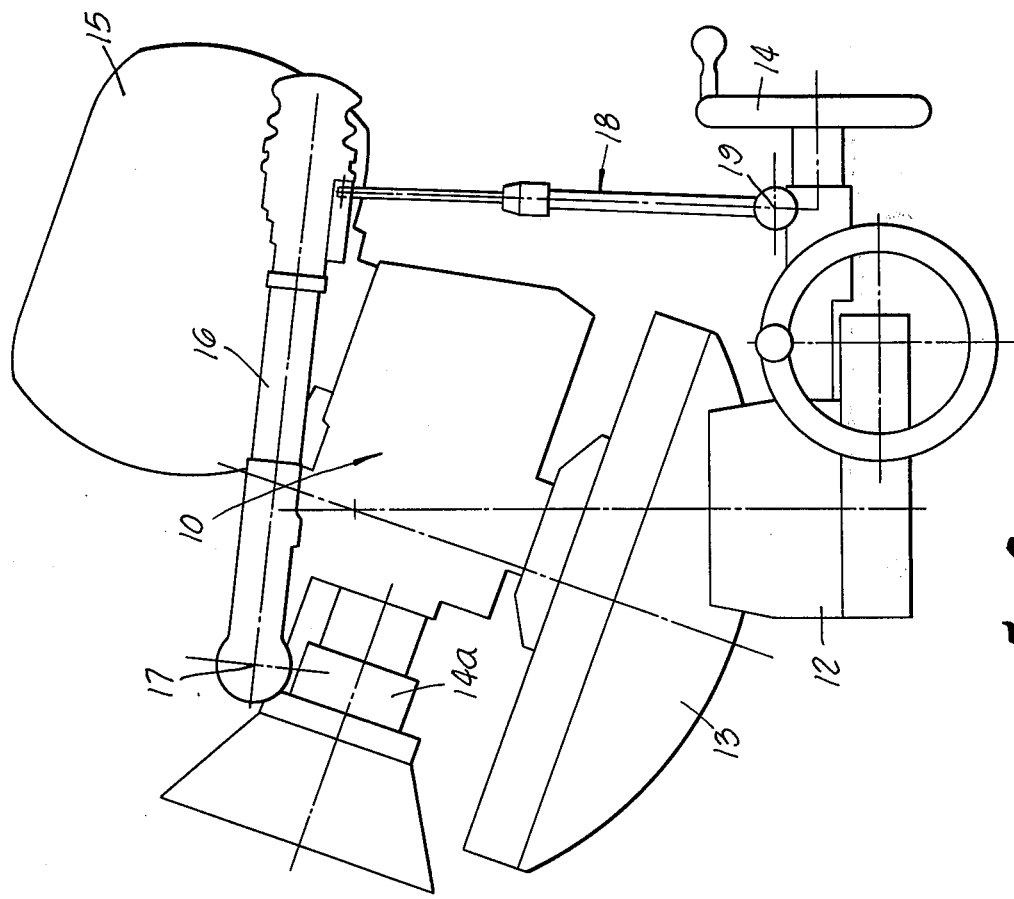

VIEWFINDER EYEPIECE LEVELING DEVICE

This invention relates to photography and is particularly directed to a device for use with a motion picture or television camera having a viewfinder eyepiece device mounted to pivot about a horizontal axis. Motion picture or television cameras of this type may be mounted on a support device known in the art as a "head" or a "gear head". The gear head permits the camera to be swung from side to side for "pan" shots as well as to be tilted about a horizontal axis to photograph either up or down.

When a conventional motion picture camera is used with a conventional gear head for an inclined shot, the camera is tilted by means of the gear head, but viewfinder eyepiece device moves with the camera, and this requires the cameraman to crouch down while looking upward through the eyepiece, or to position his head as high as required so that he can look down through the eyepiece.

This difficulty is overcome through the use of the present invention which acts to hold the viewfinder eyepiece device at a convenient height against any substantial movement regardless of tilting up or down. A link is pivotally connected at one end to the base member of the gear head, and is pivotally connected at the other end to the viewfinder eyepiece device. Accordingly, as the camera is tilted either up or down the viewfinder eyepiece device remains substantially at the same level.

Other and more detailed objects and advantages will appear hereinafter.

IN THE DRAWINGS

FIG. 1 is a side elevation in diagrammatic form showing a preferred embodiment of this invention.

FIG. 2 is an end view thereof.

FIGS. 3 and 4 are views similar to FIG. 1, showing the camera tilted upward, and downward.

Referring to the drawings, the motion picture camera generally designated 10 is secured by a clamp 11 to a gear head device or camera support mechanism having a base 12 and tiltable support member 13. A gear head device of this general type is shown in the Arnold U.S. Pat. No. 1,943,360. Turning of the hand wheel 14 causes the support member 13 to tilt about a horizontal axis A—A and this in turn tilts the motion picture camera 10. The lens 14a and the film magazine 15 tilt with the camera 10.

The viewfinder eyepiece device is pivotally mounted on the camera at 17 so that it may move about a horizontal axis parallel to the axis A—A. The camera shown is of the conventional type commonly used in the motion picture industry and is in the nature of a single lens reflex camera wherein a system of prisms and/or reflectors (not shown) reflect the field of view as seen through the object lens into the eyepiece tube 16, the latter being pivoted about the axis at 17 so that the same field of view is observed through the eyepiece regardless of the angle between the viewfinder tube and the camera axis. View finders of this type are well known in the art, as, for example, the patent to Kastner, U.S. Pat. No. 3,913,116 and particularly FIG. 4 thereof.

In accordance with this invention a link 18 is pivotally connected at its lower end 19 to the base 12 and is pivotally connected at its upper end to the viewfinder eyepiece device at 20, by means of clamp 21. The link 18 is preferably formed of two sections 22 and 23 and connected by a clamp mechanism 24. This enables the effective length of the link to be adjusted to a convenient height for the cameraman.

In operation, turning of the hand wheel 14 causes the tilting support 13 and camera 10 to tilt about the horizontal axis A—A. The viewfinder eyepiece device 16 moves very little, if at all, so that the cameraman can continue to look through the eyepiece without moving his head to any substantial degree.

Having fully described my invention it is to be understood that I am not to be limited to the details herein set forth but that my invention is of the full scope of the appended claims.

I claim:

1. In combination, a camera having a viewfinder eyepiece device mounted thereon to pivot adjacent its forward end about a horizontal axis, a camera support mechanism having a base and a tilting support member, means mounting said tilting support member on said base for movement about an axis parallel to said horizontal axis, means for securing said camera to said tilting supporting member, means for moving said tilting support relative to said base, and a link pivotally connected at one end adjacent the rear end portion of said viewfinder eyepiece device and pivotally connected at the other end to said base whereby movement of said rear end of the viewfinder eyepiece device is minimized during tilting movement of said support member and camera.

2. The combination set forth in claim 1 in which means are provided for adjusting the length of said link.

3. For use with a camera having a viewfinder eyepiece device mounted thereon to pivot adjacent its forward end about a horizontal axis, a support member mounted to tilt relative to a base about an axis parallel to said horizontal axis, and the camera being secured to said support member, the improvement comprising: a link having one end pivotally connected to said viewfinder eyepiece device adjacent its rearward end, and means pivotally connecting the other end of said link to said base to minimize movement of said rear end of said viewfinder eyepiece device during tilting movement of said support member and camera.

4. The device of claim 3 in which means are provided for adjusting the length of said link.

* * * * *